United States Patent
Wertheim et al.

(10) Patent No.: US 9,378,563 B2
(45) Date of Patent: Jun. 28, 2016

(54) METHOD FOR SIMULATING THE EFFECT OF VIEWING AN IMAGE THROUGH A COLORED FILTER OR OPHTHALMIC SPECTACLE LENS

(71) Applicants: Herbert A. Wertheim, Miami, FL (US); Philip R. Bartick, Miami, FL (US); William F. Moore, Miami, FL (US)

(72) Inventors: Herbert A. Wertheim, Miami, FL (US); Philip R. Bartick, Miami, FL (US); William F. Moore, Miami, FL (US)

( * ) Notice: Subject to any disclaimer, the term of this patent is extended or adjusted under 35 U.S.C. 154(b) by 110 days.

(21) Appl. No.: 14/182,553

(22) Filed: Feb. 18, 2014

(65) Prior Publication Data

US 2015/0235386 A1  Aug. 20, 2015

(51) Int. Cl.
*G06T 11/40* (2006.01)
*G06T 11/00* (2006.01)

(52) U.S. Cl.
CPC .............. *G06T 11/001* (2013.01); *G06T 11/40* (2013.01)

(58) Field of Classification Search
CPC .............................. G06T 11/001; G06T 11/40
USPC ................... 345/600, 593, 589; 351/222, 233
See application file for complete search history.

(56) References Cited

U.S. PATENT DOCUMENTS

| | | | |
|---|---|---|---|
| 5,528,431 A | 6/1996 | Wilkins | |
| 5,855,428 A | 1/1999 | Wilkins | |
| 6,095,650 A * | 8/2000 | Gao | G02C 13/005 351/227 |
| 6,583,792 B1 | 6/2003 | Agnew | |
| 6,891,550 B1 * | 5/2005 | Nolan | G06T 11/60 345/418 |
| 7,204,591 B2 | 4/2007 | Wertheim et al. | |
| 7,380,940 B2 | 6/2008 | Anderson et al. | |
| 7,737,989 B2 * | 6/2010 | Pettitt | G01J 3/46 345/207 |
| 8,223,336 B2 | 7/2012 | Edge | |
| 8,355,573 B2 | 1/2013 | Edge | |
| 8,427,498 B2 | 4/2013 | Ou et al. | |
| 2008/0316427 A1 * | 12/2008 | Fisher | G06F 17/5009 351/233 |
| 2009/0003578 A1 * | 1/2009 | Jain | G09B 21/00 379/211.01 |
| 2009/0248377 A1 * | 10/2009 | Shinohara | A61B 3/0025 703/6 |
| 2012/0002168 A1 * | 1/2012 | Bonnin | G01M 11/0257 351/222 |
| 2015/0097855 A1 * | 4/2015 | Dotan | G02C 13/003 345/593 |

* cited by examiner

*Primary Examiner* — Albert Wong

(57) ABSTRACT

A method for simulating the effect of viewing an image through a colored filter or colored ophthalmic spectacle, contact, intraocular or other lens is described. This method includes using a computer program to alter the red (R), green (G) and blue (B) color brightness of the individual pixels of the original image and then displaying them on the display screen or other visual display device of a computer. Each pixel's original RGB brightness value is multiplied by a fraction, which is determined by the RGB transmission of the colored lens or filter. The altered image is then displayed to a system user who will see the original image, as it would appear if seen through the colored lens or filter.

3 Claims, 1 Drawing Sheet

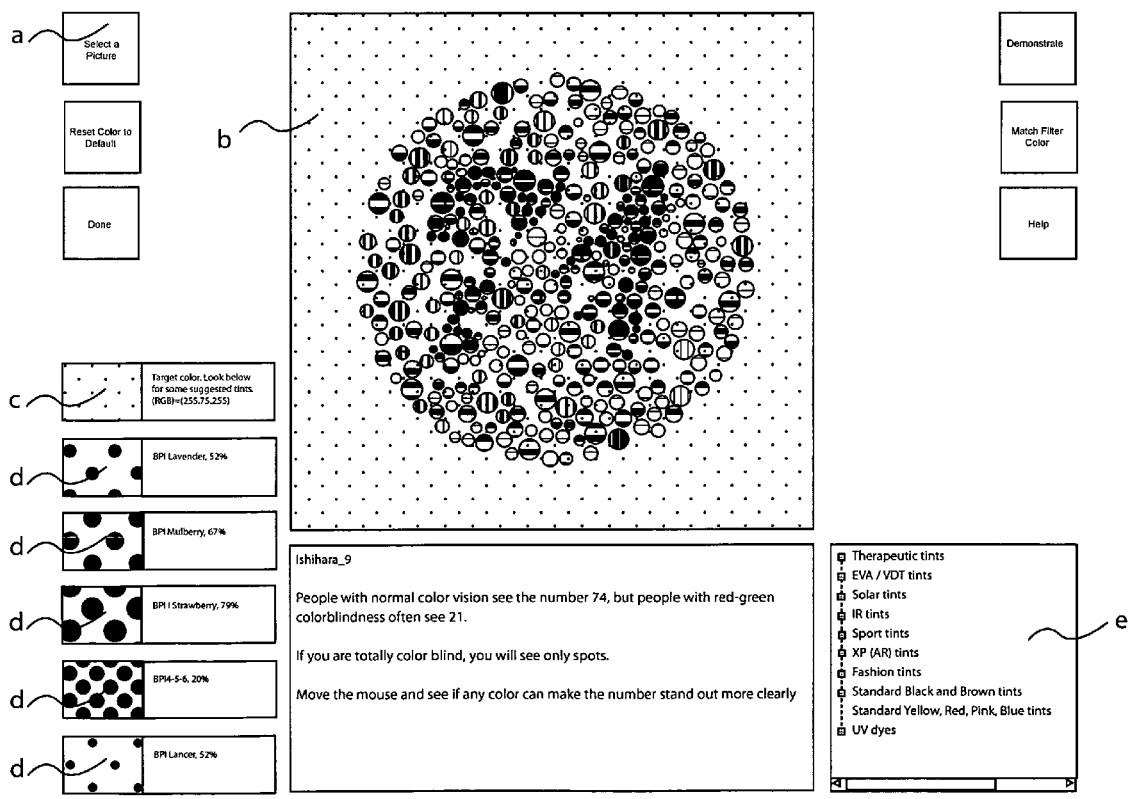

METHOD FOR SIMULATING THE EFFECT OF VIEWING AN IMAGE THROUGH A COLORED FILTER OR OPHTHALMIC SPECTACLE LENS

BACKGROUND OF THE INVENTION

1. Field of the Invention

The invention relates to a method to be used in the field of optometry, ophthalmology and optics in general to simulate the appearance of an image, as it would be seen through a colored filter or lens. Application of color to filters or spectacle, contact, intraocular or other lenses by optical laboratory workers has been a common practice. Such colored filters or lenses will then be used as a component of a sunglass or for other beneficial purposes.

2. Background of the Related Art

The selection by an end user of an appropriate color for a filter or ophthalmic spectacle, contact, intraocular, or other lens is difficult. Individuals respond differently to different colors and must evaluate the chosen filter or lens color for the application in which its use is intended. Other attempts at simulation of color to be perceived through lenses and filters have been made. Wertheim, et al, has described in U.S. Pat. No. 7,204,591 a device using RGB light emitting diodes which illuminates a pattern. Anderson, et al, in U.S. Pat. No. 7,380,940 describes another such device. Wilkins, in U.S. Pat. Nos. 5,528,431 and 5,855,428 describes a device, which uses conventional light sources and colored filters to illuminate a test pattern.

Agnew described in U.S. Pat. No. 6,583,792 a method to allow an end user to see how colored spectacle leases in eyewear would appear on his or her face by utilization of a computer program and display to superpose the image of the eyewear on an image of the person's face. In U.S. Pat. No. 8,427,498, Ou, et al, teaches a method using computer algorithms to predict and display pleasing colors for various applications. Edge, in U.S. Pat. Nos. 8,223,336 and 8,355,573, describes a method for better characterization of the human element in color perception.

All of these devices and methods are useful, but for the purpose of evaluating which color of filter or ophthalmic spectacle, contact, intraocular, or other lens may be useful in various specific applications another method is suggested.

SUMMARY OF THE INVENTION

The method herein described utilizes a computer program and display screen or other visual display device to simulate how an image will appear to the end user when observed through a colored filter or ophthalmic spectacle, contact, intraocular or other type of lens. The computer program examines each pixel of the image to be viewed and utilizes an algorithm which multiplies the pixel's original red (R), green (G) and blue (B) brightness values each by a fraction which represents the amount of light that the colored filter or lens would allow to pass in the red, green and blue. The pixels with this modified brightness are then reconstructed into an image, which when displayed, shows how the original image would appear as seen through this colored filter or lens. Some digital images will be supplied with the computer program for evaluation; however the user, to explore what filter or lens colors might be useful for another application, may upload additional digital images to the computer's digital memory database.

The method further uses a computer algorithm to allow the end user to vary the R, G and B fractional values of the filter or lens based on motions of the computer mouse as it is moved to various locations on the computer's display screen or other visual display device or by touching the computer's touch screen or by other similar manipulations. In this way, the end user may change the filter or lens color while the image is being viewed, changing the image's perceived color. FIG. 1 shows a typical display screen depicting the appearance of a filtered image. When the user has found a color which causes the image to have the desired appearance, that filter color is then displayed (FIG. 1c).

The computer's digital memory database also stores R, G and B values of standard filter colors (FIG. 1e) from which the method's computer algorithm will choose a selection of filters (FIG. 1d) which are close in color space to the filter color which was selected by the end user (FIG. 1c). Those standard filter colors may then be individually selected and the image viewed virtually through each of them for comparison with the image perceived through the filter color originally chosen by the user. As a possible use of this method, if one of those standard filter colors provides the effect desired for the user, their filter or ophthalmic spectacle, contact, intraocular or other lens could then be tinted to match that standard filter color.

BRIEF DESCRIPTION OF THE DRAWINGS

FIG. 1 is a view showing the selection menu for the visual filter.

DETAILED DESCRIPTION OF THE INVENTION

Many color space chromaticity coordinates may be used to describe a given color or hue, such as the 1931 CIE X, Y, Z, or CIE x,y,Y or CIE LAB. These are translated into R, G and B values for the computer's display screen or other visual display device. The R, G and B value of a pixel corresponds to its brightness in the red, green and blue peak emission wavelengths of the computer display screen or other visual display device. The described method first uses a computer algorithm to extract an individual pixel from a digital image. The algorithm of this method examines the pixel's R, G and B brightness numbers and then multiplies each respectively by a fraction, Fr, Fg and Fb, whose values are each less than one and which represent the transmittance of an absorptive filter color at those red, green and blue wavelengths. The computer algorithm then returns this pixel, its R, G and B brightness modified by its virtual passage through the filter color as described above, back to its original location on the computer display screen or other visual display device. When all of the pixels of an image have been so modified, the original image, now modified by virtual passage through the filter color, is displayed on the computer display screen or other visual display device.

In order to obtain the effect desired by the end user, the filter color's Fr, Fg and Fb values are changed in real time by the user's manipulation of a mouse, touch screen or other suitable computer input device. When the desired effect is obtained, the final modified image as filtered by the final values of Fr, Fg and Fb is displayed (FIG. 1b). Also, a swatch of the color of the filter used to obtain that image is displayed (FIG. 1c). The integer part of (Fr×255), the integer part of (Fg×255), and the integer part of (Fb×255) are used for the R, G and B values of that swatch which is then displayed on a small portion of the computer display screen (FIG. 1c) or other visual display device.

A computer algorithm is then used to compare the user selected Fr, Fg and Fb values with a database of the Fr1, Fg1 and Fb1 values of standard filter colors stored in the computer's digital memory. The comparison is accomplished by using the three dimensional distance between the user selected Fr, Fg and Fb values and the Fr1, Fg1 and Fb1 values of the individual standard filter colors, respectively. A small portion of the computer display screen or other visual display device shows color swatches of several of the standard filters whose Fr1, Fg1 and Fb1 values have the least distance to the user selected Fr, Fg and Fb values (FIG. 1d). The integer part of (Fr1×255), the integer part of (Fg1×255), and the integer part of (Fb1×255) are used for the respective R, G and B values of each swatch. The user then selects one of those standard filter colors and the computer algorithm displays on the display screen or other visual display device the image as filtered by virtual passage through that filter color. The end user may update the standard filter color database (FIG. 1c) with additional standard filter colors.

The digital image database (FIG. 1a), which originally consists of digital (a) photographs of ordinary natural scenes;
(b) photographs of unusually lit scenes such as bright snow or white sand;
(c) photographs of scenes including objects to be made easier to identify against a given background such as skeet against a blue sky;
(d) photographs of workplace lighting environments;
(e) test images: Ishihara color blindness test images (FIG. 1b), or an Amsler grid image used for detection of retinal problems, or an Adaptive Contrast Enhancement Test image, or other images used to diagnose various eye conditions, some of which require rapid interchange between multiple images;
(f) images of black text on a white background to simulate a written page;

may also be updated by the end user.

We claim:

1. A method of determining a color filter value for a person with a color responsive vision disorder, comprising:
    displaying an image used to diagnose the person with a color responsive vision disorder on a digital display;
    altering the RGB values of the digital display to simulate the image when viewed through a plurality of different color filters until the image is acceptable to the person;
    determining the change in RGB values in the acceptable image;
    correlating the change in RGB values to the closest color filter value within a database; and
    outputting the color filter value.

2. The method of determining a color filter value in claim 1, wherein the image is an Ishihara color blindness image, an Amsler grid, a text image for specific reading difficulty, or an Adaptive Contrast Enhancement Test image.

3. The method of determining a color filter value in claim 1, where in the step of altering the RGB values includes selecting among displayed color swatches on the digital display with corresponding RGB values.

* * * * *